(12) United States Patent
Shyu et al.

(10) Patent No.: US 8,094,166 B2
(45) Date of Patent: Jan. 10, 2012

(54) FLAT PANEL DISPLAY CAPABLE OF AUTOMATICALLY CORRECTING COLOR CHARACTERISTICS AND METHOD THEREOF

(75) Inventors: Ming-Ching James Shyu, Thornton, CO (US); Wen-Yi Chung, Taipei (TW)

(73) Assignee: Colorart Technology Inc., Taipei (TW)

( * ) Notice: Subject to any disclaimer, the term of this patent is extended or adjusted under 35 U.S.C. 154(b) by 1197 days.

(21) Appl. No.: 11/882,145

(22) Filed: Jul. 31, 2007

(65) Prior Publication Data

US 2008/0036719 A1 Feb. 14, 2008

(30) Foreign Application Priority Data

Aug. 8, 2006 (TW) ............................... 95129109 A (51) Int. Cl.
*G09G 5/00* (2006.01)
*G09G 5/02* (2006.01)
*H04N 5/46* (2006.01)
*H04N 1/46* (2006.01)
*G03F 3/08* (2006.01)
*G06K 9/40* (2006.01)
*G06F 9/445* (2006.01)
*G09G 5/36* (2006.01)
*H04N 17/00* (2006.01)
*H04N 11/00* (2006.01)
*G06K 9/00* (2006.01)

(52) U.S. Cl. ........ 345/600; 345/581; 345/591; 345/606; 345/549; 348/180; 348/552; 348/557; 348/791; 358/518; 358/523; 358/525; 382/167; 382/254; 382/274; 717/174; 717/178

(58) Field of Classification Search .................. 345/581, 345/428, 589–591, 606, 600–604, 634–644, 345/501, 549, 530, 537, 204, 690, 22, 63, 345/88; 348/177–180, 253–254, 441, 500, 348/552–553, 557–558, 560, 577, 584, 791; 358/504, 518
See application file for complete search history.

(56) References Cited

U.S. PATENT DOCUMENTS

| | | | |
|---|---|---|---|
| 5,796,384 A * | 8/1998 | Kim ................................ 345/87 |
| 6,690,383 B1 * | 2/2004 | Braudaway et al. .......... 345/600 |
| 6,850,245 B1 * | 2/2005 | Murashita et al. ............ 345/589 |
| 2002/0027603 A1 * | 3/2002 | Kuwata et al. ................. 348/232 |
| 2005/0200866 A1 * | 9/2005 | Hoshii et al. ................... 358/1.9 |
| 2007/0024878 A1 * | 2/2007 | Ota .................................. 358/1.9 |
| 2008/0036719 A1 * | 2/2008 | Shyu et al. ........................ 345/88 |
| 2008/0106764 A1 * | 5/2008 | Fujino ............................. 358/2.1 |
| 2010/0289835 A1 * | 11/2010 | Holub ............................ 345/690 |

* cited by examiner

*Primary Examiner* — Wesner Sajous
(74) *Attorney, Agent, or Firm* — Bacon & Thomas, PLLC (57) ABSTRACT

A method for correcting color characteristics of a flat panel display comprises the steps of using a signal generating device to generate an input signal to the display and a color measurement instrument to measure color displayed by the display to obtain an output value; obtaining corrected color characteristic values necessary for the display to display a target output value Txyz through the relation of an inverse function $RGB=f^{-1}(XYZ)$ between the input signal RGB and output value XYZ, and storing the corrected color characteristic values and an identification code of the display into a storage medium. The corrected color characteristic values are downloaded to a hard disk of a computer from the storage medium according to the identification code; and the computer uses a driver of the display to activate the flat panel display to display a corrected color according to the corrected color characteristic values.

9 Claims, 6 Drawing Sheets

FLAT PANEL DISPLAY CAPABLE OF AUTOMATICALLY CORRECTING COLOR CHARACTERISTICS AND METHOD THEREOF

FIELD OF THE INVENTION

The present invention relates to a flat panel display capable of automatically correcting color characteristics and its method for achieving the best color appearance of the flat panel display.

BACKGROUND OF THE INVENTION

Various different flat panel displays including plasma display panels (PDP) and liquid crystal displays (LCD) available in the market do not come with an identical light emitting capability of the three primary colors: red, green and blue after the flat panel displays are assembled, due to the deviation among the materials of the flat panel displays. These flat panel displays show different color characteristics which means that if no special color correction is taken place in the production process, these flat panel displays will have different color appearances for the same input signals. As a result, manufacturers cannot be sure that every produced flat panel display can come out with the same colors. Even in a batch of products of the same brand produced by the same manufacturing process, a consistency of color appearance cannot be achieved, and thus manufacturers usually perform a correction for the color characteristics (such as color temperature, gray scale, and white balance) of the assembled flat panel displays before they are shipped.

At present, the methods of correcting the color characteristics of the flat panel displays are divided into two major types, and the first type primarily uses an external characterization function in an open color management system (CMS), and the system adopts the concept of a color profile (which describes the characterization function) to convert the same input signal into another specific file to be displayed through corresponding color profile, so that flat panel displays with different color characteristics can come out with the same colors, and thus the color profile is provided for describing a function f( ) or an inverse function $f^{-1}$( ) of the existing relation between an input signal RGB and its corresponding color output CIE colorimetric signal XYZ of every flat panel display as shown below:

$XYZ=f(RGB)$, or $RGB=f^{-1}(XYZ)$

The system cannot correct a flat panel display to standard color characteristics, but it uses a color conversion engine to convert the original input file into another file then to be shown as specific color characteristics for different flat panel displays, and thus the system basically does not correct any color characteristic of the flat panel display. The system only describes the color display characteristics of the flat panel display by the color profile, and it is considered as color correction by external characterization engine. The color management system of this sort requires an additional memory device installed on each flat panel display or its controller for storing corresponding color profiles, such that when an original input file is received, a color conversion engine is used to correct the original input file and generate a corresponding color correction file according to the characteristics function in the color profile, and then output the color correction file temporarily stored in the memory device, so as to appear the expected color for each flat panel display. Since the system needs to perform the processes of converting, storing, and outputting when the input file is received for each time, therefore the system consumes more processing time which is inapplicable for a flat panel display (such as a television) that needs to display a huge number of instant images.

The second type is a closed color correction system which corrects the color characteristics of a flat panel display directly into certain specific color characteristics, such that when the same file is inputted, each flat panel display can show the same color appearance. When the input file in compliance with a standard specification (such as sRGB or NTSC), the flat panel will display it in compliance with the standard set forth by the specification. Traditionally, a color correction is performed by using an instrument to measure color temperature and color shift when the flat panel display shows a white color, and then manually adjusting the gain and offset of the three primary colors: red, green and blue, until the white color displayed by the flat panel display approaches target color temperature and within certain color deviation, such that the flat panel displays so produced have correct parameters including color temperature, gray scale and white balance to show the best color appearance. However, such method for manually calibrating the parameters including color temperature, gray scale and white balance not only consumes much time and efforts, but also causes inevitable discrepancies between the measured parameters of the flat panel display and the ideal parameters due to human errors occurred in the manual calibration process and causes an unstable quality of the products.

To save time and labor cost and expedite the calibration of parameters including color temperature, gray scale and white balance, it is usual to calibrate the parameters including color temperature, gray scale and white balance of a flat panel display in a batch of shipment, and use the corrected values of the three primary colors: red, green and blue so obtained as a basis to calibrate other flat panel displays in the same batch of shipment and save the values in an internal memory of the corresponding flat panel displays. In other words, the correction data, like gain and offset of the flat panel displays in the same batch of shipment are set as the same values. Although such calibration method saves a great deal of time and labor cost and expedite the calibration of color temperature, gray scale and white balance of the flat panel display, it cannot give consideration to the difference of color characteristics among various flat panel displays nor avoid sacrificing the color accuracy for each flat panel display. As a result, only one set of flat panel display can have the best color appearance, but the rest of flat panel displays cannot achieve the best color appearance.

Figure 1:
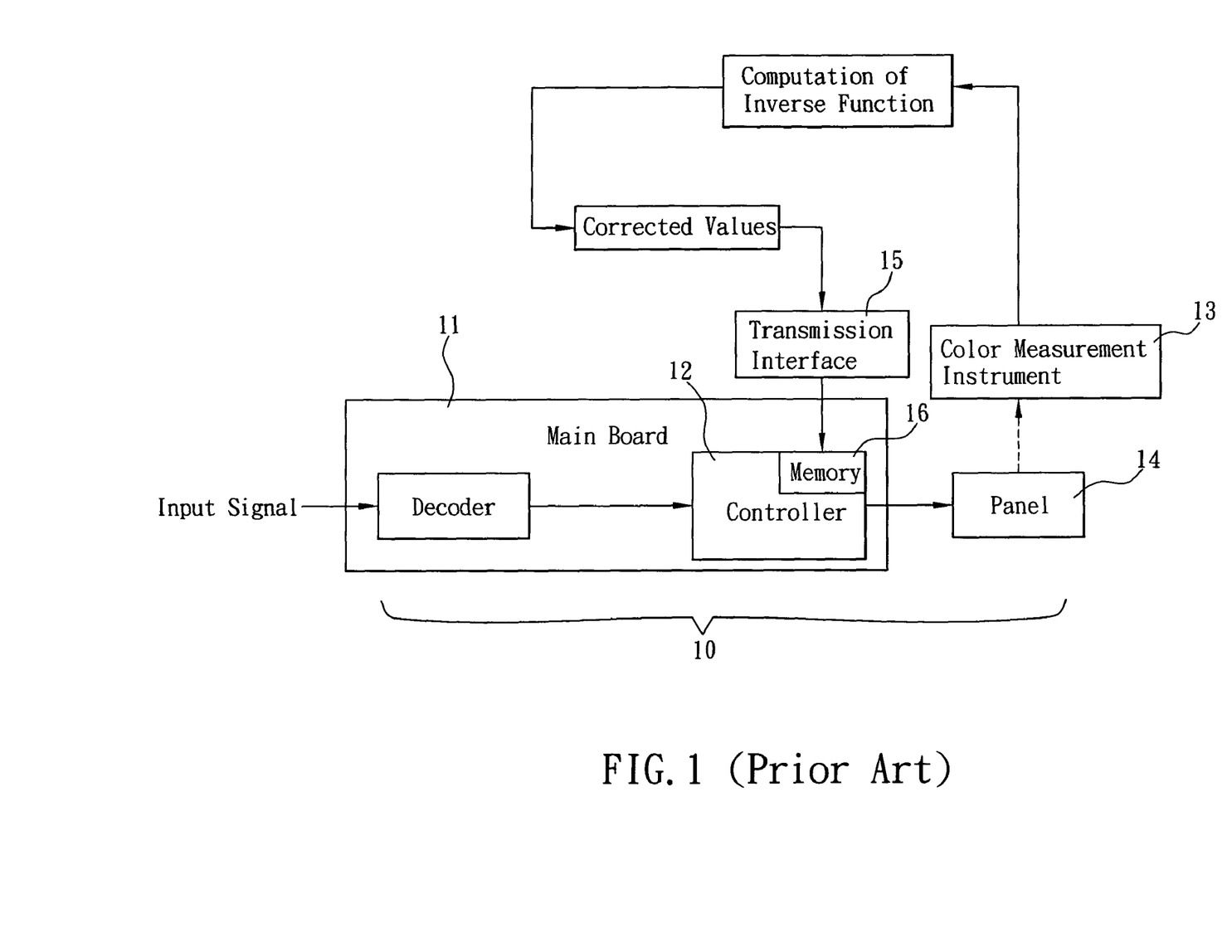
FIG. 1 is a schematic view of a circuit structure for correcting a traditional flat panel display.
Figure 2:
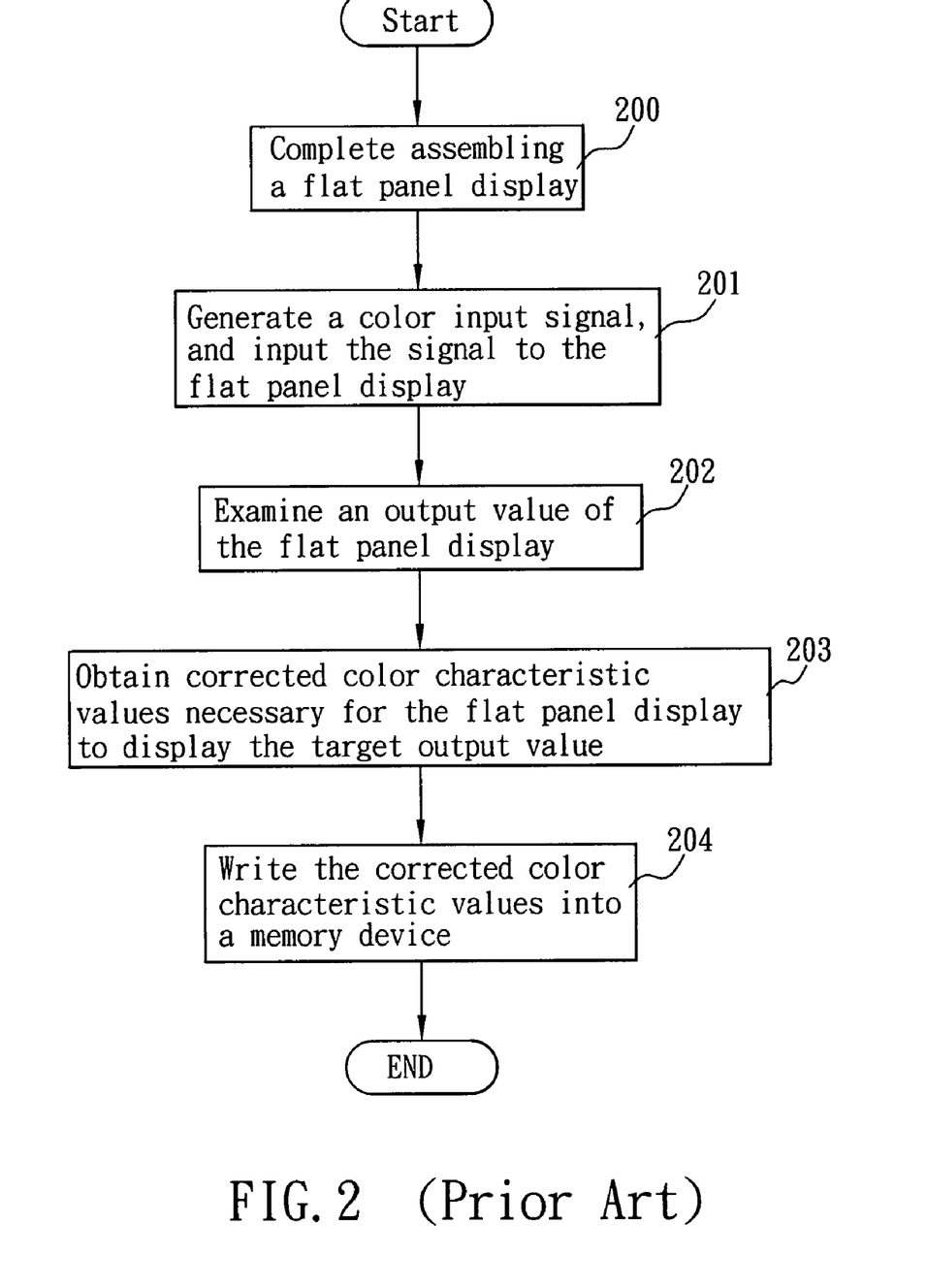
FIG. 2 is a flow chart of correcting a traditional flat panel display as depicted in FIG. 1.

To solve the aforementioned problem, many manufacturers examine the original color characteristics of every flat panel display and obtain corrected color characteristic values for correcting each flat panel display, such that the flat panel displays have standard color characteristics after the flat panel displays are assembled. The most common way is to adopt the concept of "gamma characteristic correction" to correct errors of color characteristics of each flat panel display as disclosed in U.S. Pat. No. 5,796,384, and compute the corrected color characteristic values and record the corrected values in a non-volatile memory such as a flash RAM in a hardware circuit of the flat panel display or a rewriteable memory device as shown in FIGS. 1 and 2, and its manufacturing procedure is described briefly as follows:

(200) Complete assembling all components of a flat panel display 10, wherein a main board (which is a video system board) 11 of the flat panel display 10 has a controller 12;
(201) Use a signal generating device to generate an input signal (which is a video signal), and output the signal to the flat panel display 10;
(202) Use a color measurement instrument 13 to examine the output value of the panel 14, and analyze the color characteristics;
(203) Obtain corresponding corrected color characteristic values needed in a gamma correction circuit for the flat panel display 10 to display the target output value through the computation of an inverse function between the input signal and the output value according to a set specification; and
(204) Download the corrected color characteristic values into a non-volatile memory 16 of the controller 12 through a transmission interface 15, and use the corrected color characteristic values as the permanent recorded values.

Therefore, the correction circuit can perform the color correction, but such approach needs to install additional electronic components (such as a non-volatile memory 16) on each flat panel display 10 or its controller 12, not only incurring a higher manufacturing cost, but also consumes more manufacturing time and labor in the manufacturing procedure, since it is necessary to download the corrected color characteristic values into the non-volatile memory 16 of the controller 12 through the transmission interface 15 to complete the correction of color characteristics.

SUMMARY OF THE INVENTION

In view of the foregoing shortcomings of the prior art, the inventor of the present invention based on years of experience to conduct extensive researches and experiments and finally invented a flat panel display capable of automatically correcting color characteristics and method thereof, in hope of achieving the best color appearance of each flat panel display in compliance with the cost-effectiveness.

Therefore, it is a primary objective of the present invention to overcome the foregoing shortcomings by using a signal generating device to generate a color input signal that is inputted to a flat panel display after the flat panel display is assembled, using a color measurement instrument to measure the output value of the flat panel display; obtaining corrected color characteristic values necessary for the flat panel display to display the target output value through the computation of an inverse function between the input signal and the output value according to a set specification, and storing the corrected color characteristic values and the identification code of the flat panel display in a database of a network server; downloading corresponding corrected color characteristic values stored in the database into a hard disk of a computer through Internet according to the identification code of the flat panel display, after the flat panel display is connected to the computer according to the installation procedure of a driver of the flat panel display, and the computer uses the driver of the flat panel display to start a color characteristic correction mechanism, such that the liquid crystal display shows the best corrected color based on the corrected color characteristic values.

Another objective of the present invention is to overcome the foregoing shortcomings by using a signal generating device to generate a color input signal which is inputted to a flat panel display after the flat panel display is assembled, using a color measurement instrument to measure the output value of the flat panel display; obtaining corrected color characteristic values necessary for the flat panel display to display the target output value through the computation of an inverse function between the input signal and the output value according to a set specification, and burning the corrected color characteristic values and the identification code of the flat panel display into an optical disk; transferring corresponding corrected color characteristic values stored in the optical disk into a hard disk of a computer according to the identification code of the flat panel display after the flat panel display is connected to the computer according to the installation procedure of a driver of the flat panel display, and the computer uses the driver of the flat panel display to start a color characteristic correction mechanism, such that the liquid crystal display shows the best corrected color based on the corrected color characteristic values. The invention not only saves the cost required for installing an additional non-volatile memory on the flat panel display, but also reduces the labor, time and cost required for uploading the corrected color characteristic values to the non-volatile memory in the production line.

To make it easier for our examiner to understand the objective, characteristics and performance of the present invention, a detailed description of the preferred embodiments with reference to the accompanying drawings are given below.

DETAILED DESCRIPTION OF THE PREFERRED EMBODIMENTS

Traditionally, a flat panel display is connected to a computer system and controlled by the computer as an output device for displaying texts and images. Regardless of desktop computers, portable computers or palmtop computer, it is necessary to install a flat panel display to the computer system. In recent years, the hard disk technology is developed rapidly, and the memory space of the built-in hard disk in a computer system becomes increasingly large. Comparing with the memory space of the built-in hard disk in the computer system, the memory space of the memory device of the controller of a traditional flat panel display is insignificant. In view of this, the inventor of the present invention intends to utilize a method to store corrected color characteristic values of a flat panel display obtained before shipping into a built-in hard disk of a computer system, when a user connects the flat panel display to the computer system, so that the computer can use a driver of the flat panel display to start a color characteristic correction mechanism to correct the flat panel display according to the corrected color characteristic values to show the best color. Such approach not only waives the use of memory device for storing the corrected color characteristic values in the flat panel display and effectively saves the cost of hardware, but also waives the correction process for the non-volatile memory through a transmission interface in a production line. Thus, the invention also can shorten the manufacturing time, simplify the manufacturing procedure, and lower the overall manufacturing cost.

Figure 3:
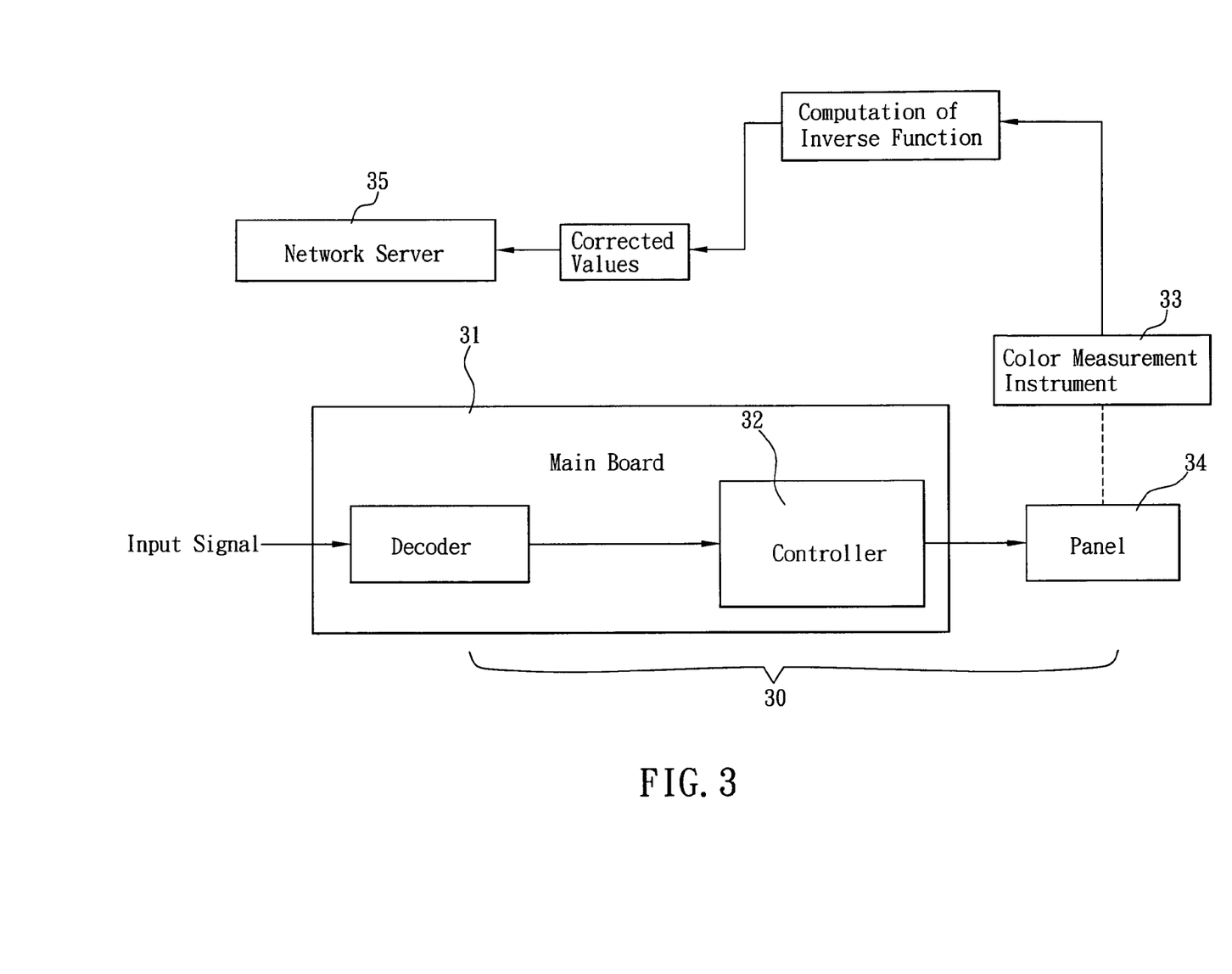
FIG. 3 is a schematic view of a circuit structure for examining a flat panel display in accordance a first preferred embodiment of the present invention.
Figure 4:
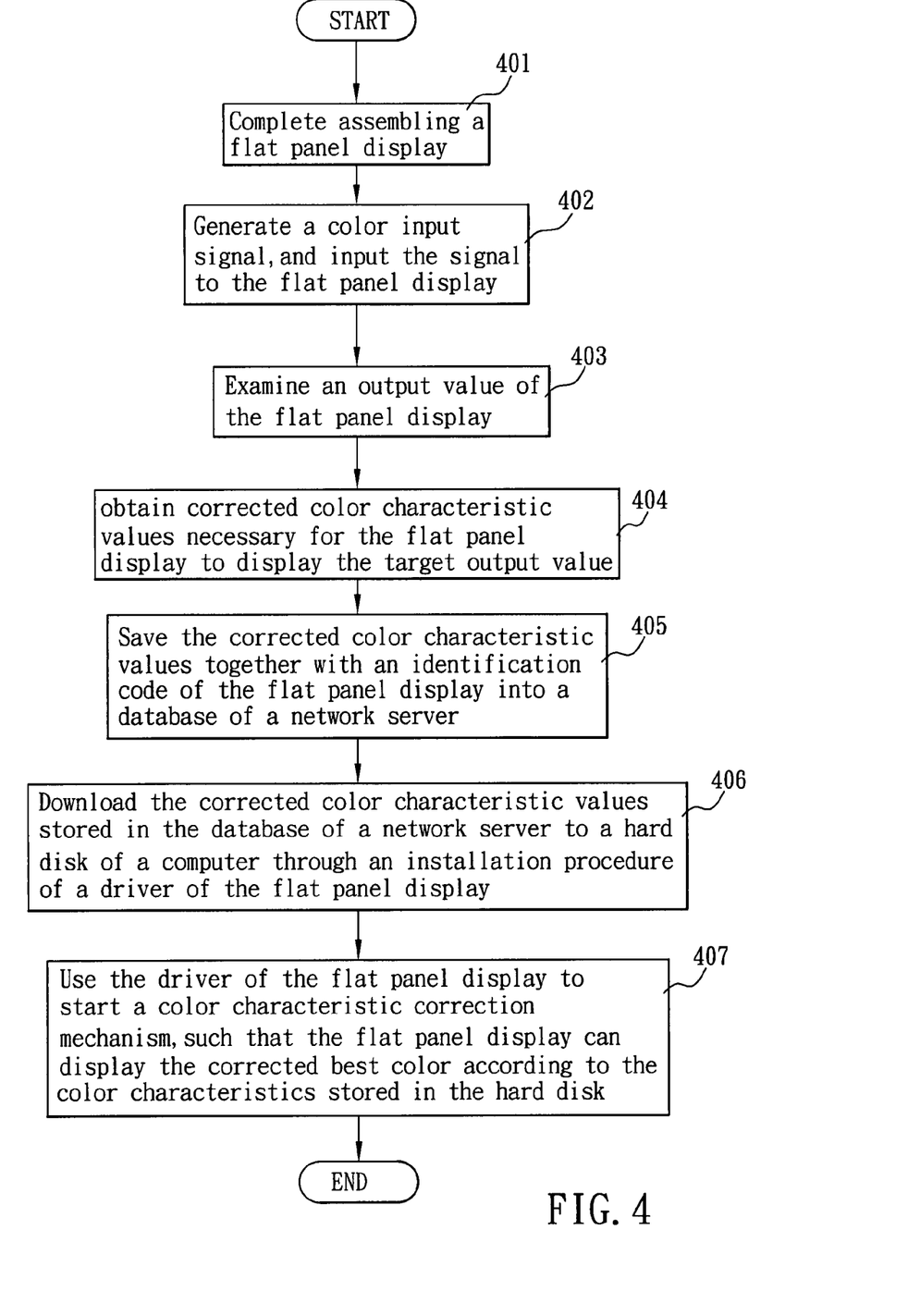
FIG. 4 is a flow chart of examining and correcting a flat panel display in accordance a first preferred embodiment of the present invention.

Referring to FIGS. 3 and 4 for a first preferred embodiment of a flat panel display capable of automatically correcting color characteristics and method thereof in accordance with the present invention, a computer is used to read corresponding corrected color characteristic values of the flat panel display from the database of a manufacturer's network server at a remote end through Internet, and such method comprises the steps of:

(401) completing the assembling of all components of a flat panel display 30 and the main board 31 of the flat panel display 30 has a controller 32;

(402) using a signal generating device (not shown in the figure) to generate color input signal RGB, and inputting the signal to the flat panel display 30;

(403) using a color measurement instrument 33 to examine a panel 34 and measure displayed color output value XYZ (such as the color hue CIE XYZ) and analyzing the displayed color characteristics;

(404) creating a characteristic function f( ) and its inverse function $f^{-1}$ for signal characteristics between the input signal RGB and the output value XYZ such as:

$$XYZ=f(RGB), \text{ and}$$

$$RGB=f^{-1}(XYZ),$$

and setting a target output value Txyz according to a set specification and obtaining input value Trgb, which is equal to $f^{-1}(Txyz)$, corresponding to the target output value through the computation of the inverse function, so that the original RGB→XYZ relation is changed to the relation RGB→Trgb→Txyz by installing a "correction function" g( ), i.e. Txyz=f(g(RGB))=f(Trgb), or Trgb=g (RGB), so as to obtain the corrected color characteristic values R_gain, G_gain and B_gain necessary for the flat panel display 30 to display the target output value Txyz, change the color characteristics thereof and show a special output color characteristic corresponding to a specific input signal; and the correction function g( ) is the value of the color characteristic correction function of the flat panel display 30, which is a value conversion look-up-table to map the original input signal RGB of the flat panel display 30 to another set of input values Trgb, such that the flat panel display 30 can display an ideal target output value Txyz;

(405) saving the corrected color characteristic values together with the identification code (such as a unique product serial number) of the flat panel display 30 into a database of a network server 35, and the corrected color characteristic values are provided for users to download the values from the network server 35 through Internet;

(406) downloading corresponding corrected color characteristic values stored in a database of the network server 35 into a hard disk (not shown in the figure) of a computer through Internet according to the identification code of the flat panel display 30 by means of an installation procedure of a driver of the flat panel display 30 after the flat panel display 30 is connected to the computer (not shown in the figure); and (407) the computer using the driver of the flat panel display to start a color characteristic correction mechanism, such that the flat panel display can display the corrected best color according to the corrected color characteristic values stored in the hard disk.

Comparing with the traditional manufacturing process of the flat panel displays, this embodiment of the invention not only saves the cost of installing additional non-volatile memory on the flat panel display and reduces a great deal of labor, time and cost for writing the corrected color characteristic values into the non-volatile memory through the transmission interface in the production line.

Figure 5:
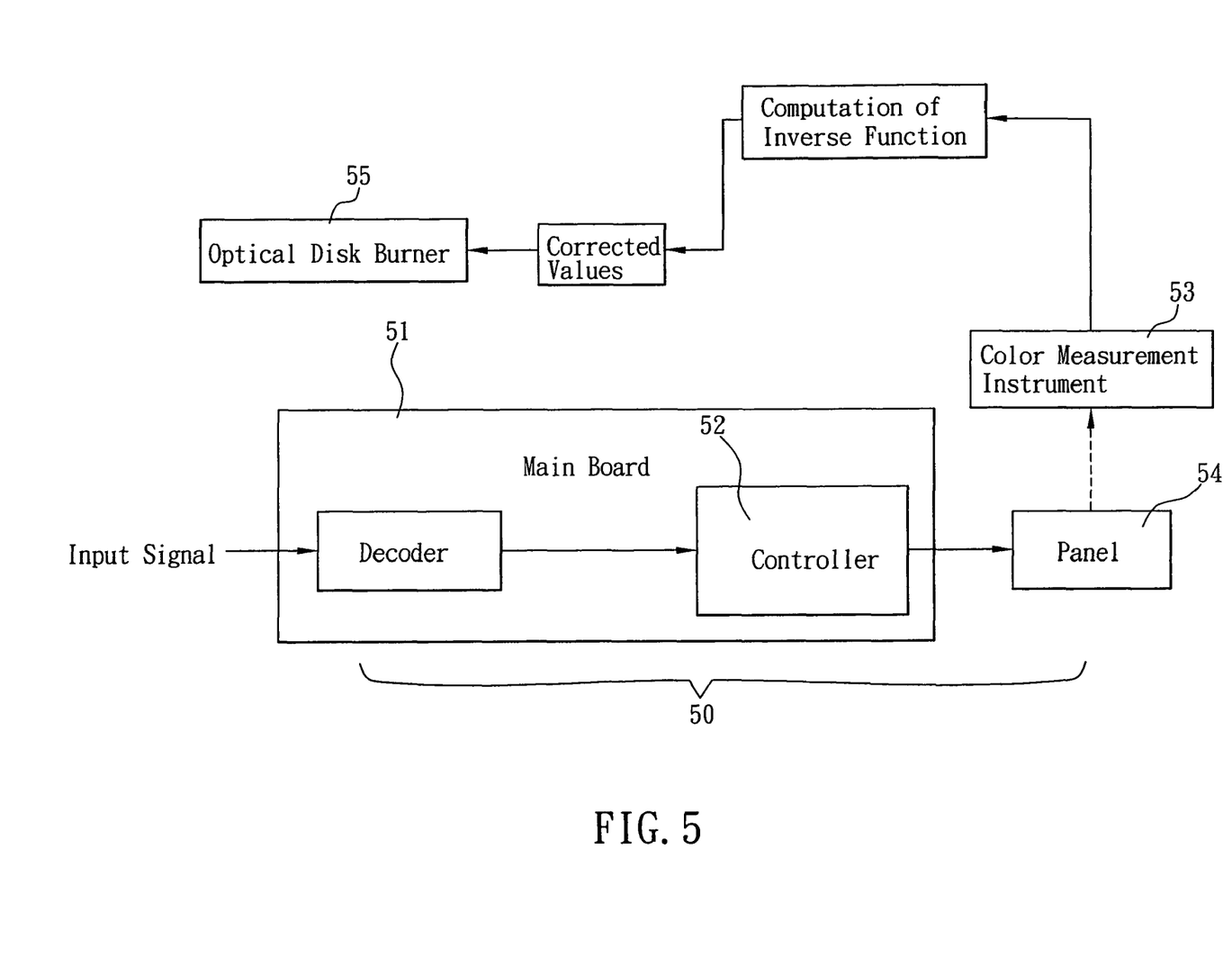
FIG. 5 is a schematic view of a circuit structure for examining a flat panel display in accordance a second preferred embodiment of the present invention.
Figure 6:
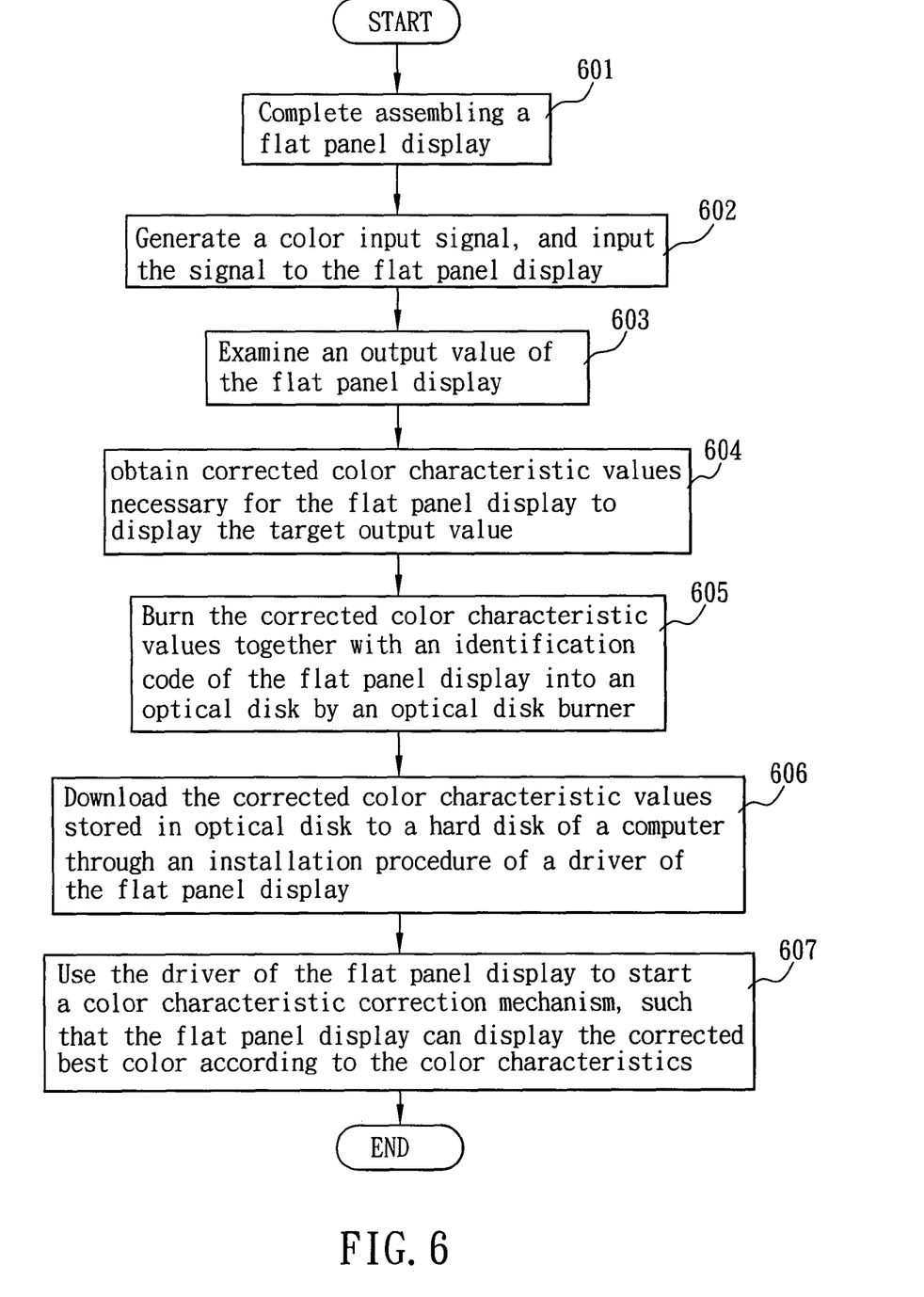
FIG. 6 is a flow chart of examining and correcting a flat panel display in accordance a second preferred embodiment of the present invention.

Referring to FIGS. 5 and 6 for a second preferred embodiment of the present invention, a computer is used to read the corresponding corrected color characteristic values stored in an optical disk bundled by the manufacturer, and the method comprises the steps of:

(601) completing the assembling all components of a flat panel display 50 and a main board 51 of the flat panel display 50 has a controller 52;

(602) using a signal generating device to generate color input signal, and outputting the signal to the flat panel display 50;

(603) using a color measurement instrument 53 to examine output value of the flat panel display 50 and analyzing the displayed color characteristics;

(604) obtaining the corrected color characteristic values necessary for the flat panel display 50 to display the target output value through the computation of the foregoing inverse function according to a set specification;

(605) burning the corrected color characteristic values together with an identification code (such as a unique product serial number) of the flat panel display 50 into an optical disk (not shown in the figure) by an optical disk burner 55;

(606) downloading the corrected color characteristic values stored in the optical disk to a hard disk (not shown in the figure) of a computer through an installation procedure of a driver of the flat panel display 50 after a user connects the flat panel display 50 to the computer system (not shown in the figure); and (607) the computer using the driver of the flat panel display 50 to start a color characteristic correction mechanism, such that the flat panel display 50 can display the corrected best color according to the corrected color characteristic values.

In the foregoing preferred embodiment, a user refers to a general consumer, a computer manufactures, or any other person who connects the flat panel display to the computer system and uses the computer system to execute the driver of the flat panel display to complete the whole installation procedure. Traditionally, when any user connects a flat panel display to a computer system and executes its driver, he or she doesn't know the processing actions taken in the whole installation procedure, and thus the present invention allows a user to conveniently download the corrected color characteristic values to a hard disk of the computer from a remote end or a near end when executing the driver of the flat panel display. Further, the corrected color characteristic values are computed and obtained according to the color characteristics of every flat panel display, and thus manufacturers can trace, edit and update the corrected color characteristic values stored in a database anytime as described in the first preferred embodiment of the present invention, so as to add extra functions, such that when a user executes the driver of the flat panel display or starts the updating interface, the network server can trace its original characteristics according to the identification code of the flat panel display, and further compute various optimal different corrected values for the user's choice. Therefore, the present invention not only greatly lowers the overall manufacturing cost of the flat panel display, but also provides a way of updating the color characteristics of the flat panel display at a later date.

It is noteworthy to point out that the network server and optical disk described in the abovementioned preferred embodiments are used for illustrations, but they are not limited to such in actual practices of the present invention. Any ordinary person skilled in the art can use other storage medium to store the corrected color characteristic values and make them available for a computer to read and download the values into its hard disk, and all these modifications are intended to be covered in the patent claims of the present invention.

While the invention herein disclosed has been described by means of specific embodiments, numerous modifications and variations could be made thereto by those skilled in the art without departing from the scope and spirit of the invention set forth in the claims.

What is claimed is:

1. A method for correcting color characteristics of a flat panel display, comprising:
   using a signal generating device to generate an input signal RGB and inputting said input signal RGB to a flat panel display after said flat panel display is assembled;
   using a color measurement instrument to measure a color displayed by said flat panel display to obtain an output value XYZ of said flat panel display;
   obtaining corrected color characteristic values necessary for said flat panel display to display a target output value Txyz through the computation of an inverse function RGB=$f^{-1}$(XYZ) between said input signal RGB and said output value XYZ according to a set specification, and storing said corrected color characteristic values together with an identification code of said flat panel display into a storage medium;
   downloading corresponding corrected color characteristic values to a hard disk of a computer from said storage medium according to said identification code of said flat panel display through the installation procedure of said driver after said flat panel display is connected to said computer; and
   said computer using said driver of said flat panel display to start a color characteristic correction mechanism, such that said flat panel display can display a corrected color according to said corrected color characteristic values.

2. The method of claim 1, wherein said storage medium is a database of a network server, and said corresponding corrected color characteristic values are downloaded to said hard disk of said computer from said database through Internet according to said identification code of said flat panel display through the installation procedure of said driver after said flat panel display is connected to said computer.

3. The method of claim 1, wherein said storage medium is an optical disk, and said corresponding corrected color characteristic values are downloaded to said hard disk of said computer from said optical disk according to said identification code of said flat panel display through the installation procedure of said driver after said flat panel display is connected to said computer.

4. The method of claims 1, wherein said computation of said inverse function according to said set specification comprising the steps of:
   creating the relation of a characteristic function XYZ=f(RGB) and said inverse function RGB=$f^{-1}$(XYZ) between said input signal RGB and said output value XYZ;
   using the relation of said inverse function RGB=$f^{-1}$(XYZ) to derive a target input value Trgb=$f^{-1}$(Txyz) corresponding to a target output value Txyz according to said set specification;
   creating a correction function g( ), which is Trgb=g (RGB) between said input signal RGB and said target input value Trgb; and
   obtaining corrected color characteristic values necessary for said flat panel display to display said target output value Txyz through the computation of said correction function g( ).

5. The method of claims 2, wherein said computation of said inverse function according to said set specification comprising the steps of:
   creating the relation of a characteristic function XYZ=f(RGB) and said inverse function RGB=$f^{-1}$(XYZ) between said input signal RGB and said output value XYZ;
   using the relation of said inverse function RGB=$f^{-1}$(XYZ) to derive a target input value Trgb=$f^{-1}$(Txyz) corresponding to a target output value Txyz according to said set specification;
   creating a correction function g( ), which is Trgb=g (RGB) between said input signal RGB and said target input value Trgb; and
   obtaining corrected color characteristic values necessary for said flat panel display to display said target output value Txyz through the computation of said correction function g( ).

6. The method of claims 3, wherein said computation of said inverse function according to said set specification comprising the steps of:
   creating the relation of a characteristic function XYZ=f(RGB) and said inverse function RGB=$f^{-1}$(XYZ) between said input signal RGB and said output value XYZ;
   using the relation of said inverse function RGB=$f^{-1}$(XYZ) to derive a target input value Trgb=$f^{-1}$(Txyz) corresponding to a target output value Txyz according to said set specification;
   creating a correction function g( ), which is Trgb=g (RGB) between said input signal RGB and said target input value Trgb; and
   obtaining corrected color characteristic values necessary for said flat panel display to display said target output value Txyz through the computation of said correction function g( ).

7. A method for correcting color characteristics of a flat panel display, comprising:
   a computer downloading corresponding corrected color characteristic values, necessary for said flat panel display to display a target output value Txyz, to a hard disk of said computer from a storage medium according to an identification code through the installation procedure of a driver of said flat panel display, after said flat panel display is connected to said computer; and
   said computer using said driver of said flat panel display to start a color characteristic correction mechanism, so that said flat panel display shows a corrected color according to said corrected color characteristic values.

8. The method of claim 7, wherein said corrected color characteristic values are computed by a procedure comprising the steps of:
   creating the relation of a characteristic function XYZ=f(RGB) and its inverse function RGB=$f^{-1}$(XYZ) between an input signal RGB and an output value XYZ of said flat panel display;

using the relation of said inverse function RGB=$f^{-1}$(XYZ) to derive a target input value Trgb=$f^{-1}$(Txyz) corresponding to a target output value Txyz according to a set specification;

creating a correction function g( ), which is equal to Trgb=g (RGB), between said input signal RGB and said target input value Trgb; and obtaining corrected color characteristic values necessary for said flat panel display to display said target output value Txyz through the computation of said correction function g( ).

9. A flat panel display capable of automatically correcting color characteristics, comprising:

a flat panel display, having an identification code;

a set of corrected color characteristic values, obtained by inputting an input signal RGB to said flat panel display after said flat panel display is assembled, examining an output value XYZ of said flat panel display, and computing corrected color characteristic values necessary for said flat panel display to display a target output value Txyz, according to a set specification, through the relation of an inverse function of RGB=$f^{-1}$(XYZ) between said input signal RGB and said output value XYZ; and a driver, for downloading said set of corrected color characteristic values to a hard disk of a computer according to said identification code of said flat panel display through the installation procedure of said driver of said computer after said flat panel display is connected to said computer, and using said driver to start a color characteristic correction mechanism, such that said flat panel display can display the corrected color according to said corrected color characteristic values.

* * * * *